US012172276B2

(12) United States Patent
Lin

(10) Patent No.: US 12,172,276 B2
(45) Date of Patent: Dec. 24, 2024

(54) APPARATUS FOR INSTALLING FASTENERS AND EXPLOSIVE LOADS FOR USE THEREWITH

(71) Applicant: Joe Lin, Missouri City, TX (US)

(72) Inventor: Joe Lin, Missouri City, TX (US)

( * ) Notice: Subject to any disclaimer, the term of this patent is extended or adjusted under 35 U.S.C. 154(b) by 316 days.

(21) Appl. No.: 17/711,175

(22) Filed: Apr. 1, 2022

(65) Prior Publication Data
US 2022/0219304 A1  Jul. 14, 2022

Related U.S. Application Data

(63) Continuation-in-part of application No. 16/180,087, filed on Nov. 5, 2018, now Pat. No. 11,298,811.

(51) Int. Cl.
*B25C 1/12* (2006.01)
*B25C 1/00* (2006.01)
*F16B 19/14* (2006.01)

(52) U.S. Cl.
CPC ............ *B25C 1/12* (2013.01); *B25C 1/008* (2013.01); *F16B 19/14* (2013.01)

(58) Field of Classification Search
CPC  B25C 1/188; B25C 1/105; B25C 1/12; B25C 1/123; B25C 1/126; B25C 1/143; F16B 19/14
USPC .................................. 227/9–11; 411/440–441
See application file for complete search history.

(56) References Cited

U.S. PATENT DOCUMENTS

| | | | | | |
|---|---|---|---|---|---|
| 2,663,259 | A | * | 12/1953 | Catlin ..................... | F16B 19/14 411/440 |
| 2,932,031 | A | * | 4/1960 | Reymond ............... | B25C 1/188 227/11 |
| 3,060,855 | A | * | 10/1962 | Marsh ..................... | F41A 15/04 102/472 |
| 6,095,739 | A | * | 8/2000 | Albertson ........... | F16B 15/0092 411/13 |
| 6,669,158 | B2 | * | 12/2003 | Masas ..................... | E04B 9/006 411/441 |
| 6,688,829 | B1 | * | 2/2004 | Popovich ................ | F16B 19/14 411/61 |
| 6,789,364 | B2 | * | 9/2004 | Popovich ................. | E04B 9/18 52/745.1 |
| 2008/0302846 | A1 | * | 12/2008 | Thompson .............. | B25C 1/186 411/441 |
| 2011/0068239 | A1 | * | 3/2011 | Thompson .............. | F16B 19/14 403/42 |

(Continued)

*Primary Examiner* — Joshua G Kotis
(74) *Attorney, Agent, or Firm* — John R Casperson

(57) ABSTRACT

A bracket for attachment to an overhead substrate to carry a suspending wire or rod is formed from metal plate or strap stock having a bend connecting a first generally rectangular section of the stock with a second generally rectangular section of the stock. The first generally rectangular section of stock has a dimple formed on one side of the stock with a corresponding bulge protruding from the other side. The bulge protrudes alongside the second generally rectangular section of stock. The bulge has a base and an apex, a generally conical outside surface adjacent to the first generally rectangular section of stock and a through aperture at the apex. The bracket is applied with a tool that can be provided with a washer system to accommodate different fastener lengths and a safety to deactivate the triggering mechanism.

12 Claims, 9 Drawing Sheets

(56) References Cited

U.S. PATENT DOCUMENTS

| | | | |
|---|---|---|---|
| 2011/0198383 A1* | 8/2011 | Masas | F16B 19/14 227/156 |
| 2012/0000960 A1* | 1/2012 | Masas | B25C 1/12 227/9 |
| 2012/0321413 A1* | 12/2012 | Masas | F16B 19/14 411/440 |
| 2015/0097100 A1* | 4/2015 | Lin | F16M 13/027 248/216.1 |

* cited by examiner

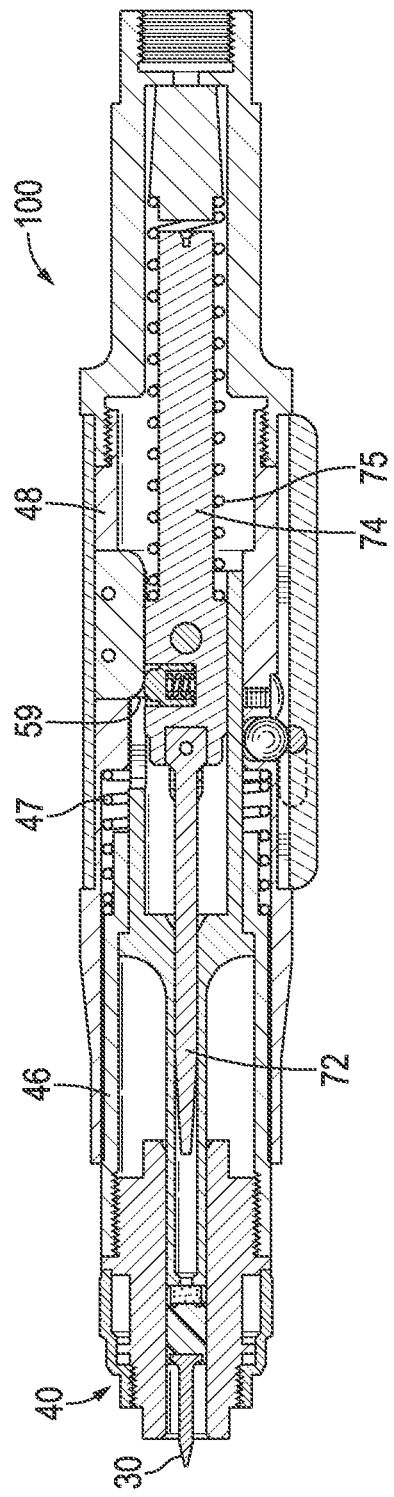
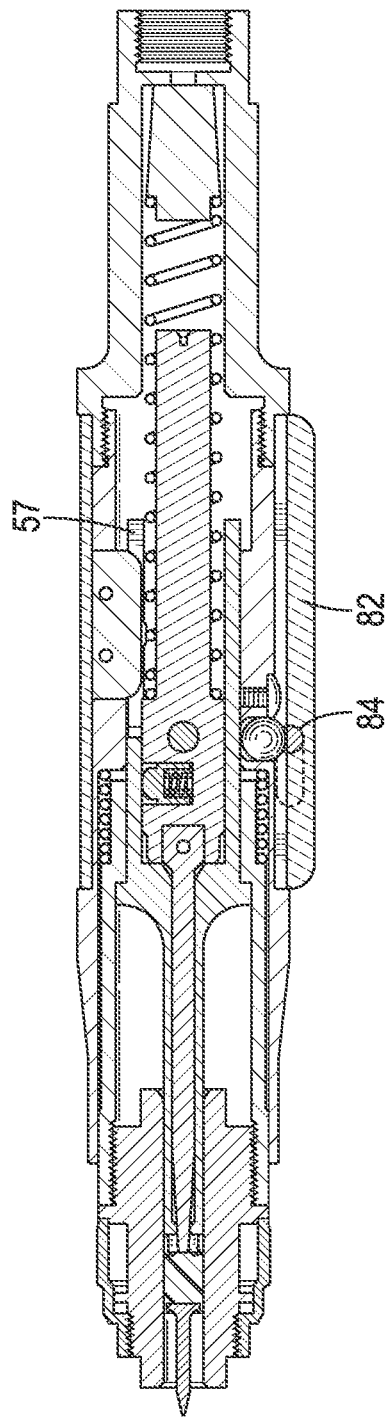
FIG. 3
FIG. 4

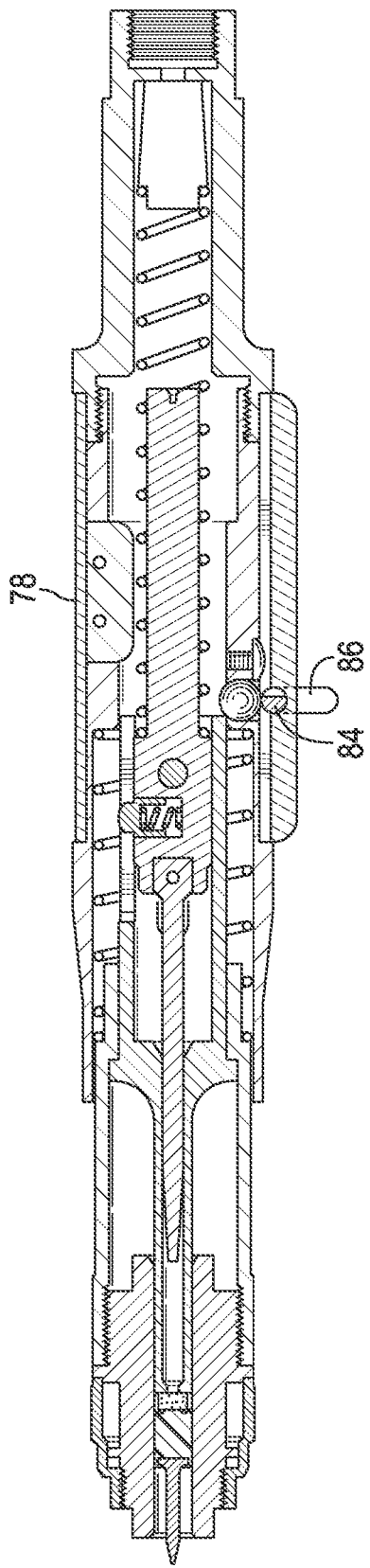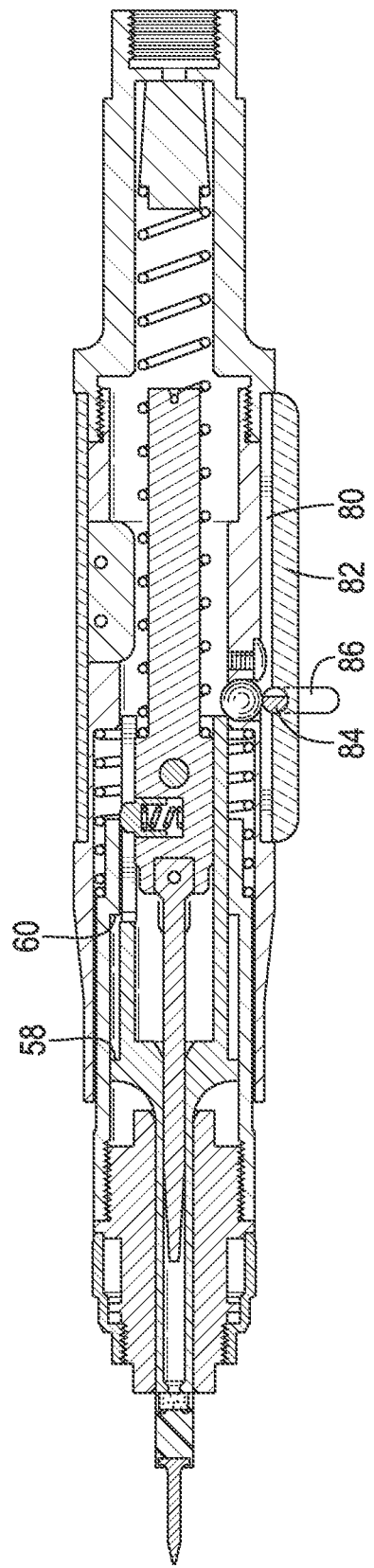

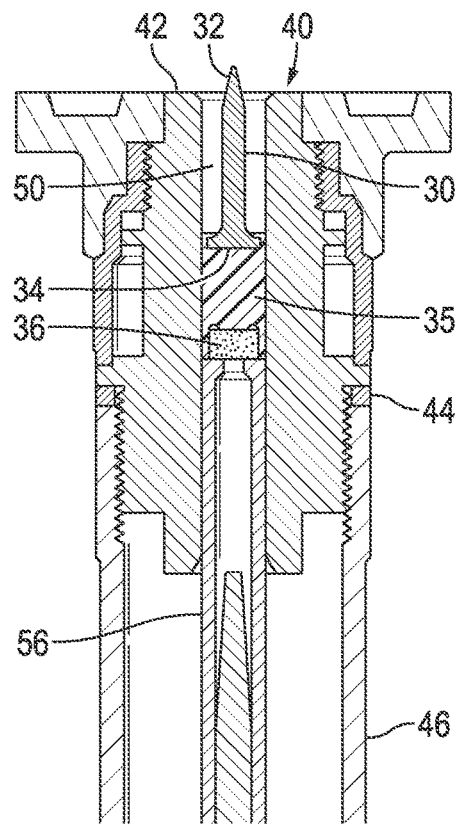
FIG. 10
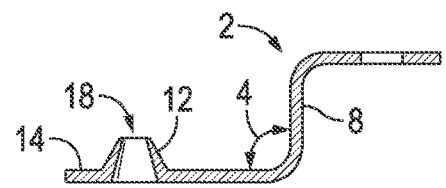
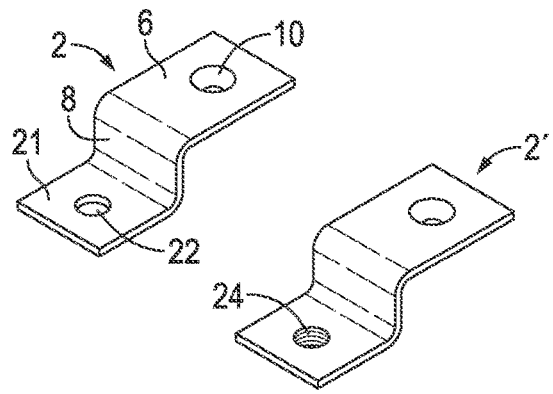
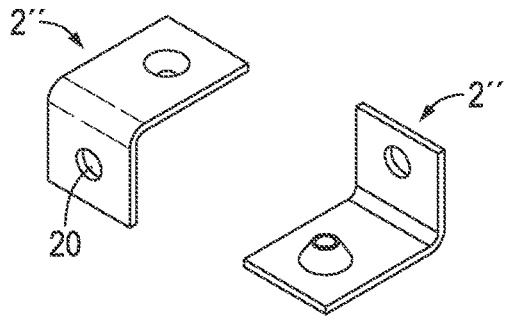
FIG. 11

APPARATUS FOR INSTALLING FASTENERS AND EXPLOSIVE LOADS FOR USE THEREWITH

FIELD OF THE INVENTION

This invention relates broadly to explosively driven fasteners More particularly, this invention relates to an apparatus for installing explosively driven fasteners and explosive loads and brackets for use therewith.

INCORPORATION BY REFERENCE

The disclosure of U.S. Pat. No. 8,397,969 issued Mar. 19, 2013 is incorporated by reference herein.

BACKGROUND OF THE INVENTION

The fasteners with brackets as disclosed in U.S. Pat. No. 8,397,969 are of unitary construction. However, power charges, nail lengths, and bracket configuration are all individually optimized for a given application. This variability requires a large inventory of the possible power charge/nail/bracket combinations for steady work on a project, causing high inventory costs. Also, in the event of a misfire, bent nail, or excessively spalled penetration, nothing can be salvaged of the power charge/nail/bracket combination, causing waste cost to be undesirably high.

OBJECTS OF THE INVENTION

It is therefore an object of the invention to provide an improved tool for installing an explosively driven fastener that can accommodate nails of different lengths as well as an improved explosively driven fastener for use therewith that permits changeout of bracket configurations and salvage of components in the event of a malfunction.

It is a further object of this invention to provide a tool that is safer to unload or clear in the event of a malfunction or failure to fire.

SUMMARY OF THE INVENTION

One embodiment of the invention is in the form of a bracket for attachment to an overhead substrate to carry a suspending wire or rod. The bracket is formed from metal plate or strap stock having a bend connecting a first section of the stock with a second section of the stock. The sections are preferably generally rectangular. The first section of stock defines an aperture, preferably at the bottom of a dimple formed on one side of the stock, preferably by stamping, with a corresponding protuberance, for example, an extrusion, tube or a bulge, preferably a bulge, protruding from the other side. The bulge protrudes alongside the second section of stock. The bulge has a base and an apex, a generally conical outside surface adjacent to the first section of stock and a through aperture at the apex.

The bracket will ride on the end of a tool that carries a nail extending loosely through the aperture and has a nest depression to accommodate the protuberance. The tool preferably is adjustable to accommodate different length nails. The bracket is preferably provided with a pre-tied wire. As compared to systems that use brackets that are press fitted to nails, the number of inventory items is greatly reduced.

Another embodiment of the invention is provided in the form of a tool for installing an explosively driven fastener. The fastener includes a nail, an explosive load attached to the nail, and a separate bracket. The tool comprises a receiver, a firing pin plunger, a firing pin spring, a firing pin, and a muzzle assembly. The firing pin plunger is located within the receiver. The firing pin plunger has a proximal end and a distal end. The firing spring is arranged to bias the firing pin plunger out of the receiver. The firing pin has a proximal end and a distal end. The distal end is pointed. The firing pin is separate from the firing pin plunger. The proximal end of the firing pin is removably coupled to the distal end of the firing pin plunger. The assembly has a proximal end and a distal end. The proximal end is arranged to receive the firing pin and the distal end is arranged to receive the nail and explosive load, and a portion of the bracket, such that when the fastener is placed on the distal end of the muzzle assembly and the firing pin plunger is biased out of the receiver by the firing spring, the firing pin strikes the explosive load causing the explosive load to explode and drive the nail out of the muzzle assembly.

Another embodiment of the invention is provided in the form of a tool having a safety device for installing an explosively driven fastener, the fastener including a nail and an explosive load attached to the nail. The tool comprises a receiver, a firing pin plunger, a firing spring, a firing pin, a muzzle assembly, a trigger plunger and spring, a firing pin guide, and a safety blocking element. The firing pin plunger is located within the receiver. The firing pin plunger has a proximal end and a distal end. The firing spring is arranged to bias the firing pin plunger out of the receiver. The firing pin has a proximal end and a distal end. The distal end is pointed. The firing pin is separate from the firing pin plunger. The proximal end of the firing pin is removably coupled to the distal end of the firing pin plunger. The assembly has a proximal end and a distal end. The proximal end is arranged to receive the firing pin and the distal end is arranged to receive the nail and explosive load, and a portion of the bracket, such that when the fastener is placed on the distal end of the muzzle assembly and the firing pin plunger is biased out of the receiver by the firing spring, the firing pin strikes the explosive load causing the explosive load to explode and drive the nail out of the muzzle assembly. The firing pin guide extends into the receiver, the inner sleeve and the muzzle assembly. The firing pin guide has an outer flange; and the inner sleeve has an inner flange engageable by the outer flange. The trigger plunger and trigger spring are mounted transversely in the firing pin plunger, the trigger being biased radially outward from within the firing pin plunger. The firing pin guide has a slot extending from the proximal end and a widened area in the slot to receive the trigger plunger, and the receiver has an internal trigger shoe receivable by the keyway to depress the trigger plunger by sliding over it. When the tool is in a first resting position, the trigger plunger rests in the widened area of the slot thereby limiting distal movement of the firing pin, and when the tool is in a second firing position, the trigger shoe depresses the trigger plunger out of engagement with the firing pin guide allows distal movement of the firing pin under the action of the firing spring. The receiver has a first end a second end and a sidewall extending between the first end and the second end. The receiver defines a transverse borehole extending though the sidewall. The safety blocking element is mounted for radial movement in the borehole to selectively block the firing pin guide from proximal movement. When engaged, the safety blocking element prevents the firing pin guide from moving sufficiently proximally in the receiver for the trigger plunger to be depressed by the shoe.

In another embodiment of the invention, a tool for installing an explosively driven fastener comprises a receiver, a firing pin plunger, a firing spring, a firing pin, a muzzle assembly, and a rubber spall shield carrying a magnet. The fastener includes a nail, an explosive load attached to the nail, and a separate bracket. The bracket can include a depending wire which can be temporarily retained on the side of the tool or its mounting pole by a second magnet. The firing pin plunger is located within the receiver. The firing pin plunger has a proximal end and a distal end. The firing spring is arranged to bias the firing pin plunger out of the receiver. The firing pin has a proximal end and a distal end. The distal end is pointed. The firing pin is separate from the firing pin plunger. The proximal end of the firing pin is removably coupled to the distal end of the firing pin plunger. The muzzle assembly has a proximal end and a distal end, the proximal end is arranged to receive the firing pin and the distal end is arranged to receive the nail and explosive load, and a portion of the bracket, such that when the fastener is placed on the distal end of the muzzle assembly and the firing pin plunger is biased out of the receiver by the firing spring, the firing pin strikes the explosive load causing the explosive load to explode and drive the nail out of the muzzle assembly. The rubbery spall shield surrounds the distal end of the muzzle assembly and has a distal end approximately coplanar with the distal end of the muzzle assembly. The rubbery spall shield carries a magnet for magnetically attaching to a portion of the bracket to locate the bracket until the firing pin strikes the explosive load.

Another embodiment of the invention is in the form of a bracket carrying a plastic bushing sized on its outside to closely fit an aperture in the bracket and on its inside to closely fit over a nail carried in a nail gun.

BRIEF DESCRIPTION OF THE DRAWINGS

FIG. 3 is a longitudinal cross section of the tool of FIG. 2 in a third, triggered configuration.

FIG. 4 is a longitudinal cross section of the tool of FIG. 2 in a fourth, firing configuration.

FIG. 5 is a longitudinal cross section of the tool of FIG. 2 in a fifth, safe configuration.

FIG. 6 is a longitudinal cross section of the tool of FIG. 2 is a sixth, unload configuration.

FIG. 10 is a longitudinal cross section of an end of a tool according to another embodiment of the invention illustrating placement of a nail and charge.

FIG. 11 shows fasteners according to embodiments of the invention.

DETAILED DESCRIPTION OF THE INVENTION

Figure 1:
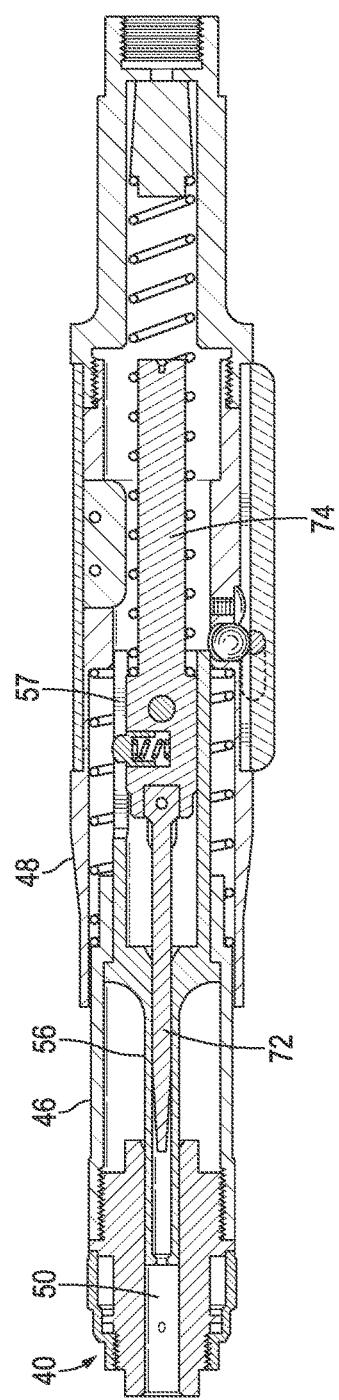
FIG. 1 is a longitudinal cross section of a tool in a first, relaxed configuration according to an embodiment of the invention.
Figure 2:
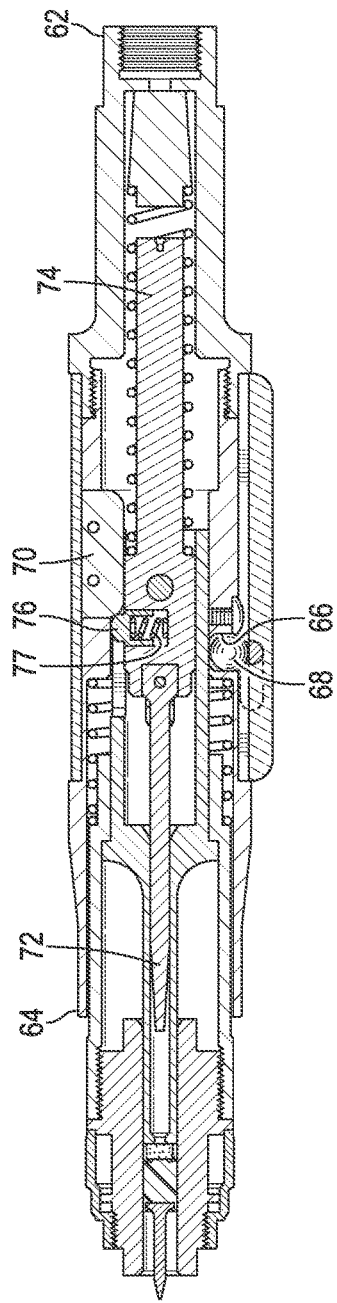
FIG. 2 is a longitudinal cross section of the tool of FIG. 1 in a second, cocked configuration and carrying a nail and charge.

With reference to FIG. 11, one embodiment of the invention is in the form of a bracket, for example, one of brackets 2, 2', 2" for attachment to an overhead substrate to carry a suspending wire or rod. The bracket is formed from metal plate or strap stock having a bend 4, preferably a right-angle bend, connecting a first section 6 of the stock with a second section 8 of the stock. The sections are preferably generally rectangular. The first generally rectangular section of stock has a perforation, for example, at the bottom of a dimple 10 formed on one side of the stock, preferably by stamping, with a corresponding protuberance 12 protruding from the other side, for example, an extrusion, bulge or tubing, preferably a bulge. The bulge or other protuberance protrudes alongside the second generally rectangular section of stock. The bulge has a base 14 and an apex 16, a generally conical outside surface adjacent to the first generally rectangular section of stock and a through aperture 18 at the apex. The inside surface of the bulge is also generally conical. In one preferred embodiment, the bracket 2 further comprises a third section 21 of stock, preferably a rectangular section, connected to the second generally rectangular section of stock by a generally right-angle bend and extending therefrom in a plane generally parallel to the first generally rectangular section of stock in a direction away from the bulge. The third section of stock defines an aperture 22. In another embodiment, the second generally section of stock of the bracket 2" defines a second aperture 20. In another embodiment, the second aperture 24 of the bracket 2' is threaded to accept a threaded rod, not shown.

In a preferred embodiment, the generally conical outside surface of the bulge converges in the direction of the apex of the bulge at a half-angle in the range of about 30 to about 60 degrees. The bulge has a height that is 30 to 50% of its outside diameter at the base. The stock is steel, the first rectangular section has a length in the range of about 1 to about 4 cm, a width in the range of about 1 to about 4 cm, a thickness in the range of about 0.1 to about 0.3 cm, and the bulge has an outside diameter at the base in the range of about 0.5 to about 1 cm.

Figure 14:
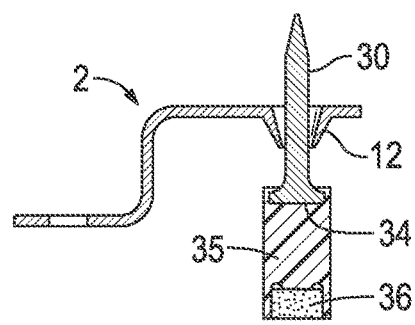
FIG. 14 shows a nail/charge/bracket combination according to an embodiment of the invention, in cross section.
Figure 15:
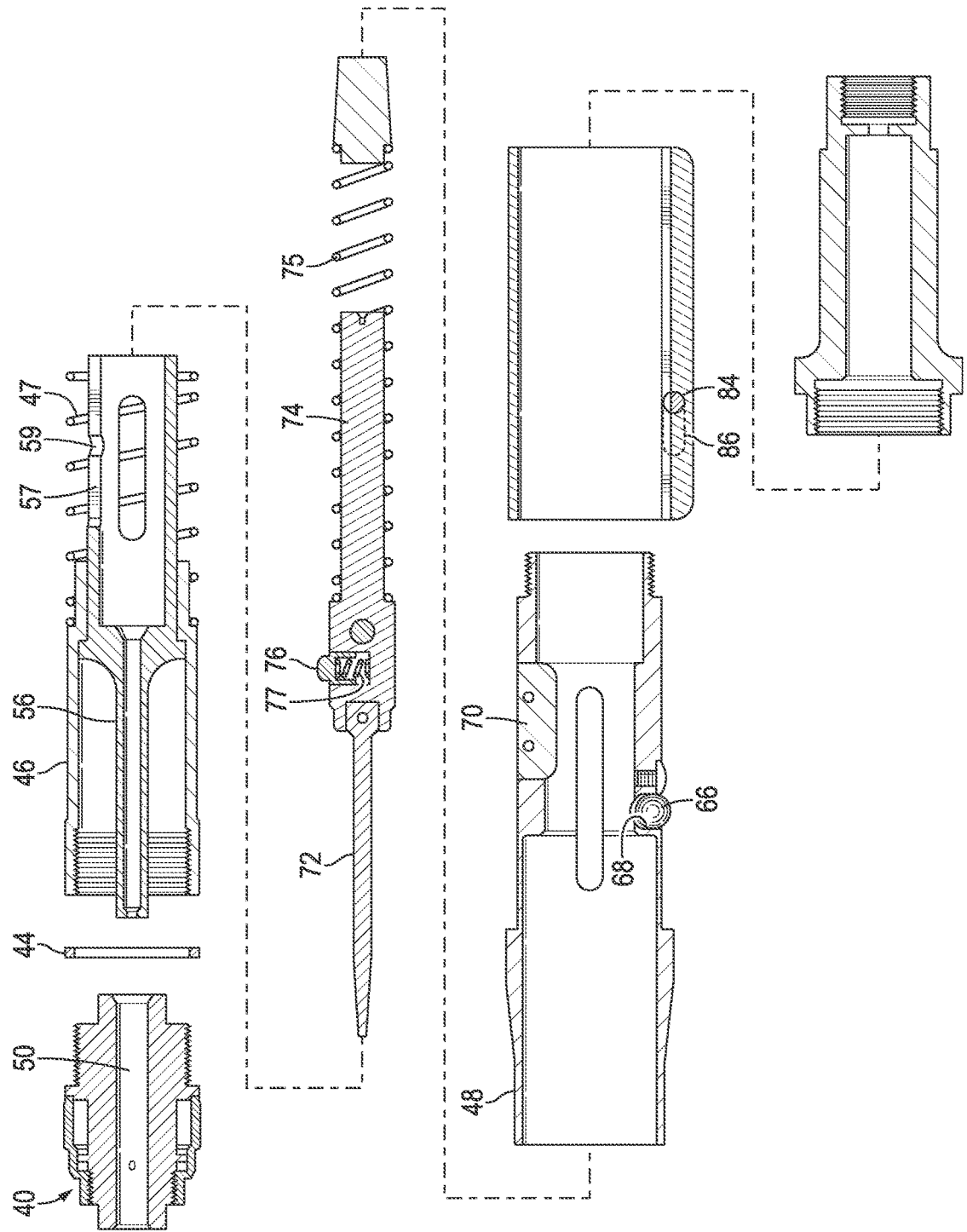
FIG. 15 shows an exploded view of a tool according to an embodiment of the invention, in longitudinal cross section.

The brackets of the invention are used in conjunction with a nail 30. See FIGS. 10 and 14. Different length nails 30', 30" for example can be used for different application. See FIG.

Figure 9:
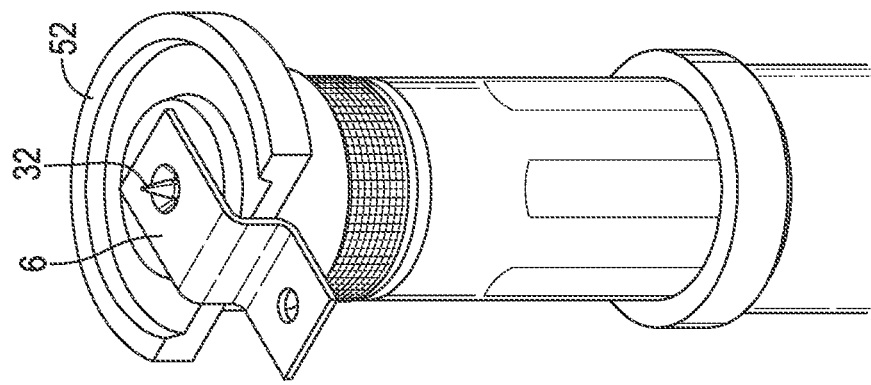
FIG. 9 is a perspective view of the end of the tool as in FIG. 8 showing placement of a bracket on the nail and end of the tool.
Figure 8:
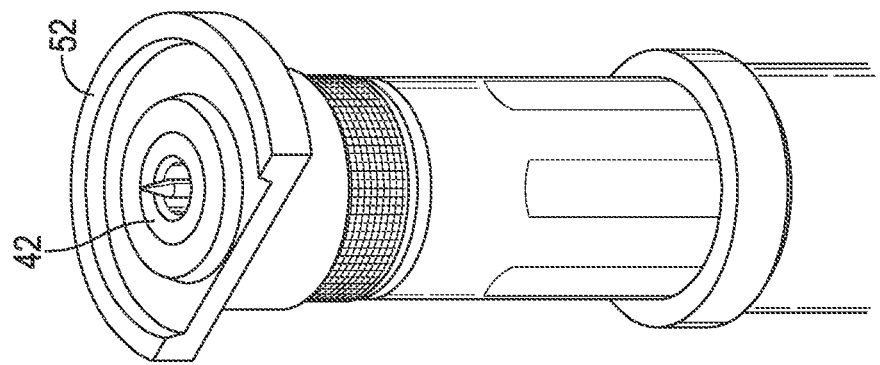
FIG. 8 is a perspective view of the end of the tool as in FIG. 7 after placement of the nail and charge.

12. The nail has a cylindrical shaft 31 (See FIG. 7), a longitudinal axis, a pointed distal end 32 and a proximal nail head 34. The cylindrical shaft is positioned loosely and slidably in the through-aperture of the apex (see FIG. 14) with the pointed distal end protruding in the range of about 0.1 to about 0.5 cm above a surface 7 of the first generally rectangular surface opposite to the protuberance. See FIG. 9.

Figure 7:
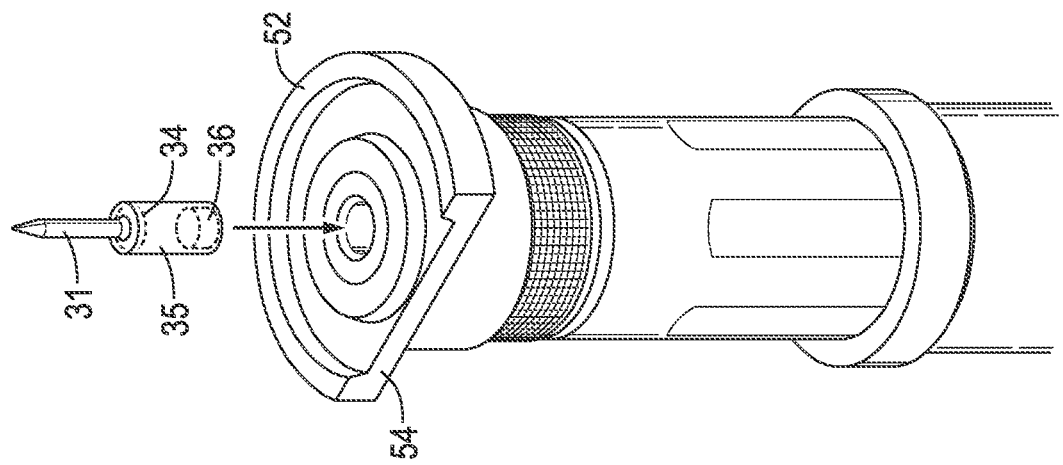
FIG. 7 is a perspective view of an end of a tool according to an embodiment of the invention showing placement of a nail and charge.
Figure 12:
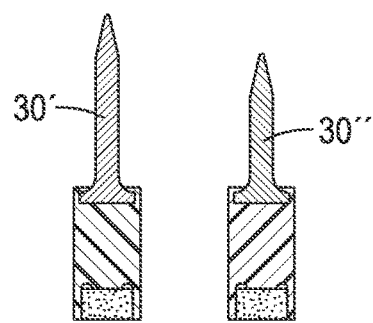
FIG. 12 shows nail/charge combinations according to embodiments of the invention.
Figure 13:
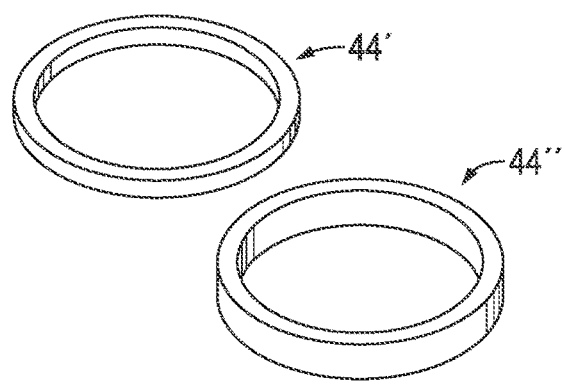
FIG. 13 shows washer/spacers according to an embodiment of the invention.

With reference to FIG. 7 for example, the nail is preferably used in combination with a plastic cap 35 having a distal end, a proximal end, and a longitudinal axis. The distal end surrounds the nail head. The proximal end contains a nitrocellulose load 36. Different strength loads can be provided if needed. The plastic cap is generally cylindrical in shape and has its longitudinal axis positioned coaxially with the longitudinal axis of the nail shaft. The plastic cap preferably has an outside diameter slightly smaller than the outside diameter of the bulge or other protuberance at its base 14. The cap, nitrocellulose load, and nail are manufactured as a unit.

The nail generally has a length between the distal end and the proximal end that is in the range of 2 to 5 cm and the plastic cap and/or nitrocellulose load is preferably color-coded dependent on the length of the nail.

Conventional fasteners are comprised of nails and brackets hooks or clips that are mostly assembled using a press-tight fitting or through additional metal fittings that need to be combined before use. The disadvantage of this design is that when the assembled, complete fastener fails to fix to the substrate or the nail fails to shoot, the entire fastener assembly is scrapped and cannot be reused, resulting in excess waste. This invention can reuse the same bracket and, providing that the nail/cap/load piece is replaced, reduces waste.

As compared to using a tight-fitting bracket, the bracket only loosely covers the nail piece in the invention, and the tool is adjusted with a color-coded washer 44, 44', 44" for example so that the point of the nail piece protrudes above the bracket no more than 5 millimeters. A bowl-shaped structure is provided on the underside of the bracket which enters completely into the tool beneath the bracket beneath the nail tip. This bowl structure enters completely into the tube of the tool cover, preventing nails from sliding when applying the bracket to the substrate. The feature assures that the nail is driven in straight.

To determine the shortest usable nail length, load the nail into the nosepiece of the tool until the head of the nail starts to touch the firing pin guide inside of the tool, then loosely encase the nail with the hook/clip bracket piece. When the point of the nail protrudes no more than 5 millimeters the shortest length of nail that can be used has been determined. The solution to the issue of coupling different lengths of nails is in utilizing different thicknesses of spacers to adjust the nail protrusion. The different lengths of spacers allow different lengths of nails to be loaded into the tube and ensure that after equipping the bracket the nail does not protrude more than within a 5-millimeter range outside the barrel of the nosepiece.

The combination is preferably used in conjunction with a muzzle assembly 40, (See FIG. 10) a color coded washer 44, 44', 44", an inner sleeve 46, and a receiver 48 (see FIG. 1). The inner sleeve has a distal annular endface and a proximal end. The muzzle assembly defines a generally cylindrical throughbore 50 and having a distal end and a proximal end and the distal end defines an annular endface 42. The distal end of the muzzle assembly closely receives the proximal end of the plastic cap in the throughbore. The proximal end of the muzzle assembly is threaded to the inner sleeve. The color-coded washer is retained between annular endfaces on the muzzle assembly and the inner sleeve. The inner sleeve is slidably carried by the receiver.

Figure 16:
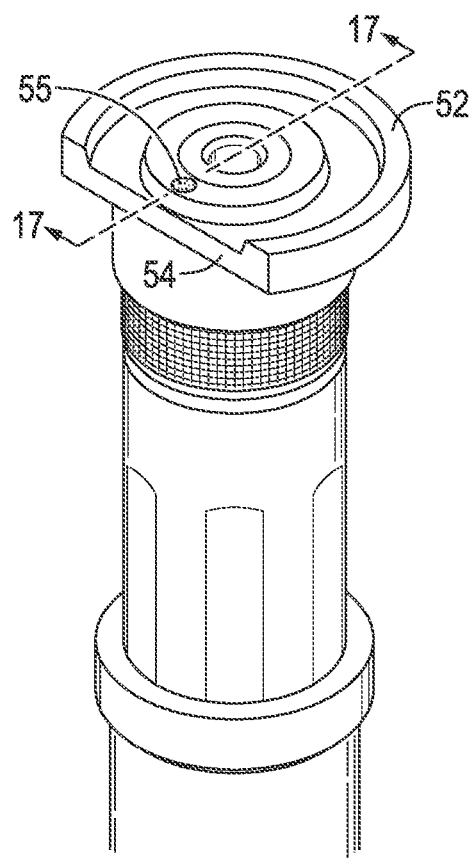
FIG. 16 is a perspective view of the end of the tool in one embodiment of the invention showing placement of a magnet in the spall shield of the tool.
Figure 17:
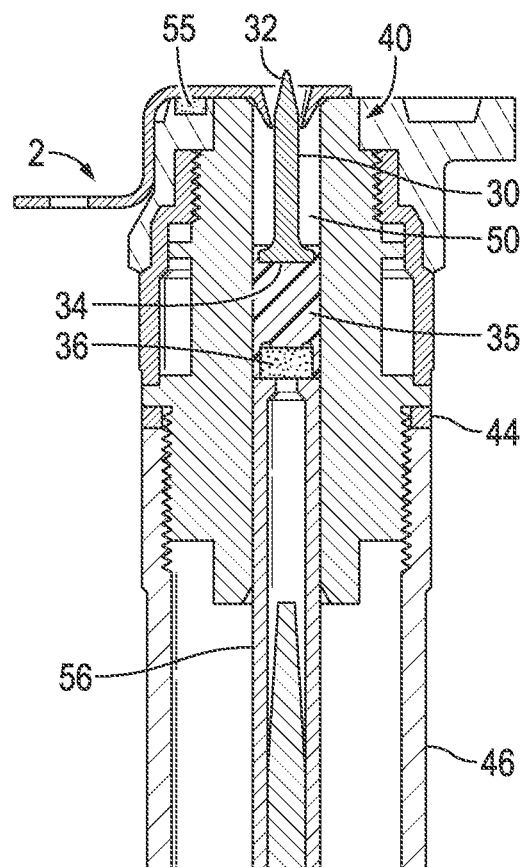
FIG. 17 is a sectional view of the end of the tool as shown in FIG. 16 when carrying a nail/charge/bracket in accordance with an embodiment of the invention.
Figure 18:
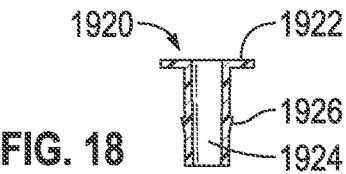
FIG. 18 is a cross sectional view of a bushing showing certain features of another embodiment of the invention.
Figure 19:
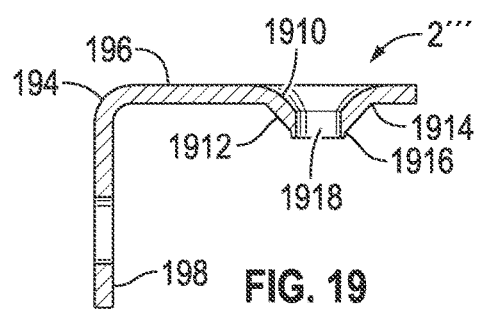
FIG. 19 is a cross sectional view of a bracket which can be used with the bushing of FIG. 18.
Figure 21:
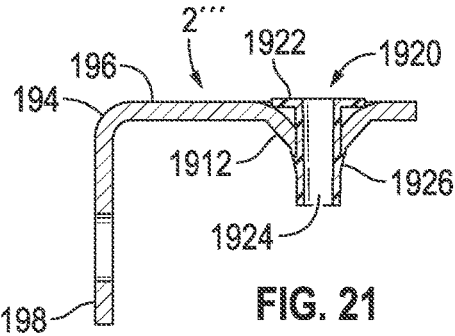
FIG. 21 is a cross sectional view of a bushing/bracket combination ready for insertion into the gun assembly of FIG. 20.
Figure 20:
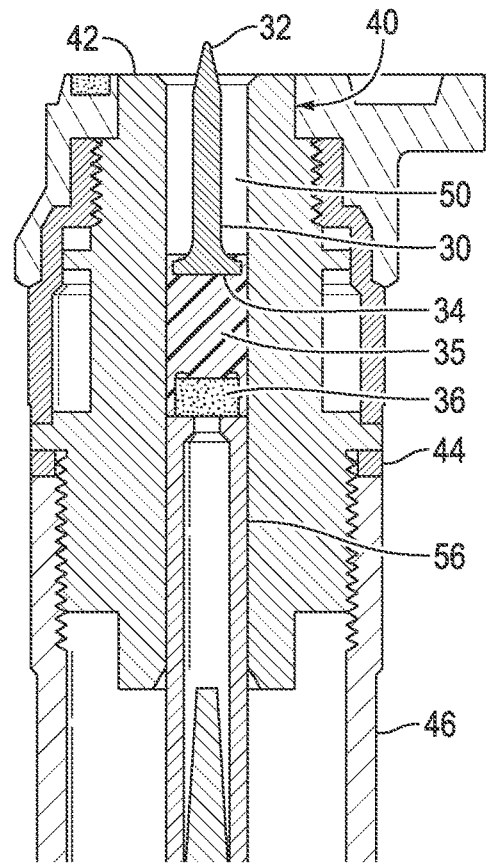
FIG. 20 is a cross sectional view of a gun assembly as in earlier described embodiment with which the newly described embodiment can be used.
Figure 22:
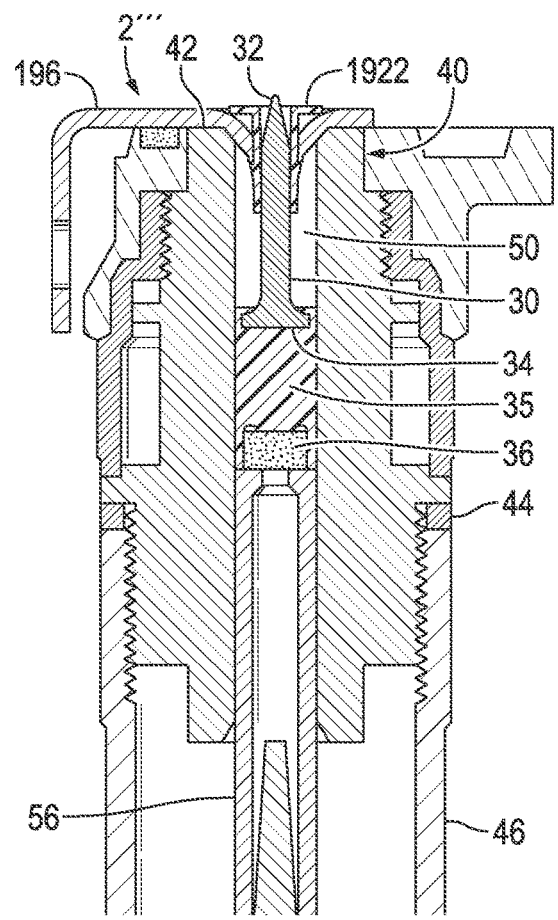
FIG. 22 is a cross sectional view of the bushing/bracket combination of FIG. 21 after insertion into the gun assembly.

The distal annular endface of the muzzle assembly contacts the first section of stock. See FIG. 9. A rubbery spall shield 52 is preferably carried on the muzzle assembly and has a segment cutaway 54 to accommodate the bracket. The cutaway has the added benefit of preventing the bracket from spinning around during manipulation of the tool. The spall shield has a distal annular endface that surrounds and is approximately co-planar with the distal annular endface of the muzzle assembly. A magnet 55 is preferably mounted in a recess, for example, a borehole, in the distal annular endface of the spall shield. The magnet is preferably located between the distal annular endface of the muzzle assembly and the cutaway. See FIG. 16. The magnet can be cylindrically shaped and can be secured by adhesive. The magnet preferably has a flat distal face that is approximately co-planar with the distal annular endface of the spall shield. The magnet helps locate the bracket after it has been placed. See FIG. 17. The tool further comprises a firing pin guide 56 having a distal end and a proximal end slidably mounted in the generally cylindrical throughbore of the muzzle assembly. The distal end of the firing pin guide supports the proximal end of the plastic cap so that the pointed distal end of the nail protrudes in the range of about 0.1 to about 0.5 cm above a surface of the first generally rectangular surface of the bracket opposite the protruding bulge. The color coded washer has a thickness as measured longitudinally which is related to the color code of the plastic cap and/or nitrocellulose load to space the distal end of the muzzle assembly from the distal end of the inner sleeve adequately to cause the distal end of the nail to protrude above the surface of the bracket in the range of 0.1 to 0.5 cm when the colors match.

The generally cylindrical throughbore of the muzzle assembly preferably has an inside diameter that is slightly larger than an outside diameter of the plastic cap. The throughbore preferably has a chamfer where it opens onto the distal endface of the muzzle assembly to provide a nest for the bulge. By accommodating the bulge, a proximal surface of the bracket can lie flat against the distal end surface of the muzzle assembly so that the bracket is stably positioned on the end of the tool.

In a preferred embodiment, the firing pin guide has an annular outwardly extending proximally facing flange 58 between the distal end and the proximal end and the inner sleeve has an annular inwardly extending distally facing flange 60 between the distal end and the proximal end for abutting the annular outwardly extending proximally facing flange of the firing pin guide. See FIG. 6. This causes the firing pin guide and the inner sleeve to move proximally together when the firing pin guide is urged proximally.

The receiver has a first end 62 a second end 64 and a sidewall extending between the first end and the second end. The receiver defines a transverse borehole 66 extending though the sidewall. A safety blocking element 68 is mounted for radial movement in the borehole to selectively block the firing pin guide from proximal movement. Compare FIGS. 1 and 5. The receiver further carries a trigger shoe 70 extending radially inwardly from the sidewall of the receiver at a location between the safety blocking element and the proximal end of the receiver.

A firing pin 72 is mounted in the firing pin guide. A firing pin plunger 74 is mounted to the firing pin and extends longitudinally proximally therefrom. A trigger plunger 76 is mounted in a transverse passage in firing pin plunger and is biased radially outwardly to move proximally with the firing pin guide until depressed by the trigger shoe. The safety blocking element when engaged prevents the firing pin guide from moving sufficiently proximally for the trigger plunger to be depressed by the shoe.

In a preferred embodiment, an outer sleeve 78 is mounted on the receiver. The outer sleeve has a longitudinal axis, a longitudinally extending inner slot 80, and an outwardly protruding portion 82 defining a radially outwardly extending ridge over the slot. See FIG. 6. The radially extending ridge defining a transverse borehole and a cam 84 is mounted in the borehole and extends across the slot. An arm 86 is mounted on one end of the cam to permit about a 90-degree rotation of the cam. The outer sleeve is mounted on the receiver so that the cam depresses the safety blocking element and prevents the firing pin guide from moving sufficiently proximally for the trigger plunger to be depressed when actuated.

The distal end of the firing pin guide is near the distal end of the barrel when the firing pin guide contacts the safety blocking element to permit ejection of the plastic cap from the generally cylindrical throughbore of the muzzle assembly by moving the inner sleeve proximally. See FIG. 6. The blocking element preferably comprises a ball bearing, as illustrated.

Another embodiment of the invention is provided in the form of a tool 100 for installing an explosively driven fastener. The fastener includes a nail, an explosive load attached to the nail, and a separate bracket. The tool comprises a receiver 48, a firing pin plunger 74, a firing spring 75, a firing pin 72, and a muzzle assembly 40. The firing pin plunger is located within the receiver. The firing pin plunger has a proximal end and a distal end. The firing spring is arranged to bias the firing pin plunger out of the receiver. The firing pin has a proximal end and a distal end. The distal end is pointed. The firing pin is separate from the firing pin plunger. The proximal end of the firing pin is removably coupled to the distal end of the firing pin plunger. The muzzle assembly has a proximal end and a distal end. The proximal end is arranged to receive the firing pin and the distal end is arranged to receive the nail and explosive load, and a portion of the bracket, such that when the fastener is placed on the distal end of the muzzle assembly and the firing pin plunger is biased out of the receiver by the firing spring, the firing pin strikes the explosive load causing the explosive load to explode and drive the nail 30 out of the muzzle assembly.

Preferably, the tool further comprises an inner sleeve 46 coaxially mounted within the receiver. The inner sleeve has a proximal end and a distal end. An inner sleeve spring 47 biases the inner sleeve away from the receiver. An annular spacer 44 is positioned between the distal end of the annular sleeve and the proximal end of the muzzle assembly. The fastener includes the nail 32, an explosive load 36 attached to the nail, and a separate bracket 2 loosely penetrated by the nail. The distal end of the muzzle assembly is chamfered to nest a portion of the bracket which is bulged out frustoconically. If desired, a second annular spacer having a different thickness longitudinally than the annular spacer can be provided to change a distance that the distal end of the nail protrudes from the distal end of the muzzle assembly or provide for the use of different length nails. Generally speaking, the spacer has an adequate thickness to cause the distal end of the nail to protrude in the range of 0.1 to 0.5 cm above the distal end of the muzzle assembly. Preferably, a distal end of the muzzle assembly supports most of a flat portion of the bracket around the bulge. More preferably, the distal end of the muzzle assembly supports most all of a flat portion of the bracket around the bulge. See FIG. 9.

This invention also adds a series of spacers with different thicknesses based on the existing tool, which is used to adjust the tool to allow the use of different lengths of pins. The invention allows the user to be able to match all different kinds of hooks & clip devices depending on application, greatly increasing its versatility, thus reducing product SKU's and lowering inventory cost.

In a preferred embodiment, the tool comprises a firing pin guide 56 extending into the receiver, the inner sleeve and the muzzle assembly. The firing pin guide has an outer flange 58 and the inner sleeve has an inner flange 60 engageable by the outer flange. A trigger plunger 76 and a trigger spring 77 mounted transversely in the firing pin plunger, the trigger being biased radially outward from within the firing pin plunger. The firing pin guide has a slot 57 extending from the proximal end and a widened area 59 in the slot to receive the trigger plunger. The receiver has an internal trigger shoe 70 receivable by the keyway to depress the trigger plunger by sliding over it. When the tool is in a first resting position, (FIG. 1) the trigger plunger rests in the widened area of the slot thereby limiting distal movement of the firing pin. When the tool is in a second firing position (FIG. 3), the trigger shoe depresses the trigger plunger out of engagement with the firing pin guide and allows distal movement of the firing pin under the action of the firing spring.

In a preferred embodiment, the receiver has a first end a second end and a sidewall extending between the first end and the second end. The receiver defines a transverse borehole 66 extending though the sidewall. The tool further comprises a safety blocking element 68 mounted for radial movement in the borehole to selectively block the firing pin guide from proximal movement. The safety blocking element when engaged prevents the firing pin guide from moving sufficiently proximally for the trigger plunger to be depressed by the shoe.

More preferably, an outer sleeve 78 is mounted on the receiver. The outer sleeve has a longitudinal axis, a longitudinally extending inner slot, and an outwardly protruding portion 82 defining a radially outwardly protruding, longitudinally extending ridge over the slot. The ridge defines a transverse borehole. A cam 84 is mounted in the borehole and extends across the slot. An arm 86 on one end of the cam permits about a 90-degree rotation of the cam. The outer sleeve is positioned on the receiver so that the cam depresses the safety blocking element and prevents the firing pin guide from moving sufficiently proximally for the trigger plunger to be depressed.

Another embodiment of the invention is provided in the form of a tool 100 having a safety device for installing an explosively driven fastener, the fastener including a nail and an explosive load attached to the nail. The tool comprises a receiver 48, a firing pin plunger 74, a firing spring 75, a firing pin 72, a muzzle assembly 40, a trigger plunger 76 and spring 77, a firing pin guide, and a safety blocking element. The firing pin plunger is located within the receiver. The firing pin plunger has a proximal end and a distal end. The firing spring is arranged to bias the firing pin plunger out of the receiver. The firing pin has a proximal end and a distal end. The distal end is pointed. The firing pin is separate from the firing pin plunger. The proximal end of the firing pin is removably coupled to the distal end of the firing pin plunger. The assembly has a proximal end and a distal end. The proximal end is arranged to receive the firing pin and the distal end is arranged to receive the nail and explosive load, and a portion of the bracket, such that when the fastener is placed on the distal end of the muzzle assembly and the firing pin plunger is biased out of the receiver by the firing spring, the firing pin strikes the explosive load causing the explosive load to explode and drive the nail 30 out of the muzzle assembly. The firing pin guide extends into the receiver, the inner sleeve 46 and the muzzle assembly. The firing pin guide has an outer flange 58 and the inner sleeve has an inner flange 60 engageable by the outer flange. The trigger plunger 76 and trigger spring 77 are mounted transversely in the firing pin plunger, the trigger being biased radially outward from within the firing pin plunger. The firing pin guide has a slot 57 extending from the proximal end and a widened area 59 in the slot to receive the trigger plunger, and the receiver has an internal trigger shoe 70 receivable by the keyway to depress the trigger plunger by sliding over it. When the tool is in a first resting position, the trigger plunger rests in the widened area of the slot thereby limiting distal movement of the firing pin, and when the tool is in a second firing position, the trigger shoe depresses the trigger plunger out of engagement with the firing pin guide allows distal movement of the firing pin under the action of the firing spring.

The receiver has a first end a second end and a sidewall extending between the first end and the second end. The receiver defines a transverse borehole 66 extending though the sidewall. The safety blocking element 68 is mounted for radial movement in the borehole to selectively block the firing pin guide from proximal movement. When engaged, the safety blocking element prevents the firing pin guide from moving sufficiently proximally in the receiver for the trigger plunger to be depressed by the shoe.

More preferably, an outer sleeve 78 mounted on the receiver. The outer sleeve has a longitudinal axis, a longitudinally extending inner slot, and an outwardly protruding portion defining a radially outwardly protruding, longitudinally extending ridge over the slot. The ridge defines a transverse borehole. A cam 84 is mounted in the borehole and extends across the slot. An arm 86 on one end of the cam permit about a 90-degree rotation of the cam. The outer sleeve is mounted on the receiver so that the cam blocks radially outward movement of the safety blocking element and prevents the firing pin guide from moving sufficiently proximally for the trigger plunger to be depressed when it is actuated. Preferably, the safety blocking element comprises a ball bearing.

One embodiment of the invention is to provide a safety device that prevents the firing function of the tool when the safety is properly engaged. Besides conforming to the traditional requirements of fastening tools that require the user apply a specific amount of compression force to actuate the tool upon contact with the substrate, this device has an added safety catch to disable the device from firing when not in use. Actuating the safety while servicing the tool or dislodging jammed fasteners helps avoid accidents and ensure increased safety. A round steel bearing is installed in the receiver. The bearing is longitudinally spaced in front of the trigger. When used to apply fasteners, the bearing is able to move up and down radially without influencing actuation by trigger. The safety mechanism, when engaged, puts a pressure release on the head of the steel bearing which stops the bearing from moving up and down radially and prevents the radial movement of the trigger plunger, thus inhibiting the mechanism's ability to fire.

Another embodiment of the invention, with reference to FIGS. 18-22, comprises a bracket 2''' for attachment to an overhead substrate to carry a suspending wire or rod. The bracket is formed from metal plate or strap stock having a bend 194, preferably a right-angle bend, connecting a first section 196 of the stock with a second section 198 of the stock. The sections are preferably generally rectangular. The first generally rectangular section of stock has a perforation 197, for example, at the bottom of a dimple 1910 formed on one side of the stock, preferably by stamping, with a corresponding protuberance 1912 protruding from the other side, for example, an extrusion, bulge or tubing, preferably a bulge. The bulge or other protuberance protrudes alongside the second generally rectangular section of stock. The bulge has a base 1914 and an apex 1916, a generally conical outside surface adjacent to the first generally rectangular section of stock and a through aperture 1918 at the apex. The inside surface of the bulge is also generally conical, in the illustrated embodiment, frustoconical where it opens onto the upper surface of the bracket, and generally cylindrical at the aperture 1918. The aperture is of larger diameter than the aperture of earlier embodiments to accommodate a plastic bushing 1920 extending through the through-aperture. See FIG. 21. The bushing is preferably constructed of a thermoplastic material, for example, Nylon®. The bushing has a first end and a second end. An annular flange 1922 extends radially outwardly at its first end. A through-passage 1924 extends from the first end to the second end. The annular flange at the first end of the plastic aperture is received by the dimple on the upper surface of the bracket. The plastic bushing has a generally cylindrical or slightly tapered outer surface that is closely received by the through-aperture opening at the apex of the protuberance. In the illustrated embodiment, the bushing has at least one fin or barb 1926 protruding from its generally cylindrical outer surface contacting the apex of the protuberance to retain the annular flange in the dimple.

The bracket/bushing combination is used in combination with a nail 30, cap 35 and load 36, and gun muzzle assembly 40. The nail has a cylindrical shaft, a longitudinal axis, a pointed distal end 32 and a proximal nail head 34. The cylindrical shaft is positioned snugly in the through-passage of the bushing, and this is different from the embodiments described earlier herein. The pointed distal end of the nail protrudes in the range of about 0.1 to about 0.5 cm above a surface of the first section of stock opposite to the protuberance. The plastic cap has a distal end, a proximal end, and a longitudinal axis. The distal end surrounds the nail head and the proximal end contains the nitrocellulose load. The plastic cap is generally cylindrical in shape and has a longitudinal axis positioned coaxially with the longitudinal axis of the nail shaft. The plastic cap has an outside diameter slightly smaller than the outside diameter of the protuberance at the base. The muzzle assembly defines a generally cylindrical throughbore 50 and has a distal end and a proximal end. The throughbore closely receives the plastic cap. The throughbore having a chamfer where it opens onto the distal endface of the muzzle assembly to provide a nest for the bulge and to permit a proximal surface of the bracket to lie flat against the distal end surface 42 of the muzzle assembly. Because the bushing fits snugly onto the nail, the magnet on the distal face of the muzzle assembly can be eliminated if desired.

While certain preferred embodiments of the invention have been described herein, the invention is not to be construed as being so limited, except to the extent that such limitations are found in the claims.

What is claimed is:

1. A system comprising a bracket for attachment to an overhead substrate to carry a suspending wire or rod, said bracket being formed from metal plate or strap stock having a bend connecting a first section of the stock with a second section of the stock, the first section of stock having an upper surface and a lower surface and a through-aperture extending between the upper surface and lower surface, and a protuberance on the lower surface that protrudes away from the lower surface and has a base and an apex, with the through-aperture extending to an opening at the apex on the lower surface of the first section of stock, a nail having a cylindrical shaft, a longitudinal axis, a pointed distal end and a proximal nail head, the cylindrical shaft positioned slidably in the through-aperture of the apex with the pointed distal end protruding in the range of about 0.1 to about 0.5 cm above the upper surface of the first section of stock opposite to the protuberance, a plastic cap having a distal end and a proximal end, the distal end surrounding the nail head, the proximal end containing a nitrocellulose load, said plastic cap being cylindrical in shape and having a longitudinal axis positioned coaxially with the longitudinal axis of the nail shaft, said plastic cap having an outside diameter smaller than the outside diameter of the protuberance at the base, wherein the nail has a length between the distal end and the proximal end that is in the range of 2 to 5 cm and the plastic cap and/or nitrocellulose load is color-coded dependent on the length of the nail, and a muzzle assembly having a distal annular endface and a proximal annular endface, a color coded washer, wherein the color code of the washer is based on the length of the nail, an inner sleeve, and a receiver, the inner sleeve having a distal annular endface and a proximal end, the muzzle assembly defining a cylindrical throughbore and having a distal end and a proximal end, the distal end of the muzzle assembly receiving the proximal end of the plastic cap, the proximal end of the muzzle assembly being threaded to the inner sleeve, the color coded washer being retained between annular endfaces on the muzzle assembly and the inner sleeve, and the inner sleeve being slidably carried by the receiver.

2. The system as in claim 1 wherein the first and second sections of stock are rectangularly shaped and the distal annular endface of the muzzle assembly contacts the first rectangular section of stock, said system further comprising a firing pin guide having a distal end and a proximal end, the distal end of the firing pin guide being slidably mounted in the cylindrical throughbore of the muzzle assembly, the distal end of the firing pin guide supporting the proximal end of the plastic cap so that the pointed distal end of the nail protrudes in the range of about 0.1 to about 0.5 cm above the upper surface of the first rectangular surface of the bracket opposite the protruding bulge.

3. The system as in claim 2 wherein the cylindrical throughbore of the muzzle assembly has an inside diameter that is larger than an outside diameter of the plastic cap, and the throughbore has a chamfer where it opens onto the distal endface of the muzzle assembly to provide a nest for the bulge and to permit a proximal surface of the bracket to lie flat against the distal end surface of the muzzle assembly.

4. The system as in claim 2 wherein the firing pin guide has an annular outwardly extending proximally facing flange between the distal end and the proximal end and the inner sleeve has an annular inwardly extending distally facing flange between the distal end and the proximal end for abutting the annular outwardly extending proximally facing flange of the firing pin guide and causing the firing pin guide and the inner sleeve to move proximally together when the firing pin guide is urged proximally.

5. The system as in claim 2 wherein the receiver has a first end a second end and a sidewall extending between the first end and the second end, said receiver defining a transverse borehole extending though the sidewall, said system further comprising a safety blocking element mounted for radial movement in the borehole to selectively block the firing pin guide from proximal movement.

6. The system as in claim 5 wherein the receiver further carries a trigger shoe extending radially inwardly from the sidewall of the receiver at a location between the safety blocking element and the proximal end of the receiver.

7. The system as in claim 6 further comprising a firing pin mounted in the firing pin guide, a firing pin plunger mounted to the firing pin and extending longitudinally proximally therefrom, and a trigger plunger mounted in a transverse passage in firing pin plunger and biased radially outwardly to move proximally with the firing pin guide until depressed by the trigger shoe, wherein the safety blocking element when engaged prevents the firing pin guide from moving sufficiently proximally for the trigger plunger to be depressed by the shoe.

8. The system as in claim 7 further comprising an outer sleeve mounted on the receiver, said outer sleeve having a longitudinal axis, a longitudinally extending inner slot, and an outwardly protruding portion defining a radially outwardly extending ridge over the slot, said radially extending ridge defining a transverse borehole, a cam mounted in the borehole and extending across the slot, and an arm on one end of the cam to permit about a 90 degree rotation of the cam, said outer sleeve mounted on the receiver so that the cam depresses the safety blocking element and prevents the firing pin guide from moving sufficiently proximally for the trigger plunger to be depressed.

9. The system as in claim 8 wherein the distal end of the firing pin guide is near the distal end of the cylindrical throughbore when the firing pin guide contacts the safety blocking element to permit ejection of the plastic cap from the cylindrical throughbore of the muzzle assembly by moving inner sleeve proximally, wherein the blocking element comprising a ball bearing.

10. A system comprising a bracket for attachment to an overhead substrate to carry a suspending wire or rod, said bracket being formed from metal plate or strap stock having a bend connecting a first section of the stock with a second section of the stock, the first section of stock having an upper surface and a lower surface and a through-aperture extending between the upper surface and lower surface, and a protuberance on the lower surface that protrudes away from the lower surface and has a base and an apex, with the through-aperture extending to an opening at the apex on the lower surface of the first section of stock and the protuberance is on the lower surface and forms a bulge having a conical outside surface, the upper surface of the bracket defining a frustoconically shaped dimple forming the inside of the bulge, a plastic bushing extending through the through-aperture, said plastic bushing having a first end and a second end, a flat faced annular end flange extending radially outwardly at its first end, and a through-passage extending from the first end to the second end, the annular flange at the first end of the bushing being received by the dimple on the upper surface of the bracket, said plastic bushing having a cylindrical outer surface extending from the flat faced annular end flange and that is closely received by the through-aperture opening at the apex of the protuberance, a nail having a cylindrical shaft, a longitudinal axis, a pointed distal end and a proximal nail head, the cylindrical shaft positioned in the through-passage of the bushing, with the pointed distal end protruding in the range of about 0.1 to about 0.5 cm above the upper surface of the first section of stock opposite to the protuberance, and a plastic cap having a distal end, a proximal end, and a longitudinal axis, the distal end surrounding the nail head, the proximal end containing a nitrocellulose load, said plastic cap being cylindrical in shape and having a longitudinal axis positioned coaxially with the longitudinal axis of the nail shaft, said plastic cap having an outside diameter smaller than the outside diameter of the protuberance at the base.

11. The system as in claim 10 wherein the bushing has at least one fin or barb protruding from its cylindrical outer surface contacting the apex of the protuberance to retain the annular flange in the dimple.

12. The system as in claim 10, further comprising a muzzle assembly defining a cylindrical throughbore and having a distal end and a proximal end, the throughbore receiving the plastic cap and having a chamfer where it opens onto a distal endface of the muzzle assembly to provide a nest for the bulge and to permit a lower surface of the bracket to lie flat against the distal end surface of the muzzle assembly.

* * * * *